United States Patent
Alexander et al.

(10) Patent No.: US 7,239,257 B1
(45) Date of Patent: Jul. 3, 2007

(54) HARDWARE EFFICIENT DIGITAL CONTROL LOOP ARCHITECTURE FOR A POWER CONVERTER

(75) Inventors: Mark A. Alexander, Austin, TX (US); Douglas E. Heineman, Lakeway, TX (US); Kenneth W. Fernald, Austin, TX (US); Scott K. Herrington, Cedar Park, TX (US)

(73) Assignee: Zilker Labs, Inc., Austin, TX (US)

( * ) Notice: Subject to any disclaimer, the term of this patent is extended or adjusted under 35 U.S.C. 154(b) by 0 days.

(21) Appl. No.: 11/376,888

(22) Filed: Mar. 16, 2006

Related U.S. Application Data

(60) Provisional application No. 60/723,282, filed on Oct. 3, 2005.

(51) Int. Cl.
*H03M 1/88* (2006.01)
*H03M 1/12* (2006.01)
(52) U.S. Cl. .................................. 341/138; 363/34
(58) Field of Classification Search ................ 341/138, 341/140, 155, 100, 118; 363/34
See application file for complete search history.

(56) References Cited

U.S. PATENT DOCUMENTS

| | | | |
|---|---|---|---|
| 4,908,564 A * | 3/1990 | Lehle ........................ 318/807 |
| 5,777,912 A | 7/1998 | Leung et al. ................ 708/319 |
| 5,841,642 A * | 11/1998 | Fitzgerald ................. 363/21.03 |
| 6,355,408 B1 * | 3/2002 | Whitcomb et al. ......... 430/619 |
| 6,650,099 B2 * | 11/2003 | Mitamura et al. .......... 323/282 |
| 6,958,721 B2 | 10/2005 | Vincent et al. ............. 341/157 |
| 2006/0023479 A1 | 2/2006 | Leung et al. |
| 2006/0055574 A1 | 3/2006 | Maksimovic et al. |
| 2006/0176175 A1 * | 8/2006 | Evans et al. ........... 340/539.22 |

* cited by examiner

*Primary Examiner*—Peguy JeanPierre
(74) *Attorney, Agent, or Firm*—Meyertons Hood Kivlin Kowert & Goetzel, P.C.; Jeffrey C. Hood; Mario J. Lewin

(57) ABSTRACT

A power converter including a hardware efficient control loop architecture. Error detection circuitry may generate an error signal based on the difference between a power converter output voltage and a reference voltage. An oversampling ADC may digitize the error signal. The transfer function associated with the ADC may include quantization levels spaced at non-uniform intervals away from a center code. A digital filter may calculate the average of the digitized error signal. A nonlinear requantizer may reduce the number of codes corresponding to the output of the digital filter. A proportional integral derivative (PID) unit may multiply the output of the nonlinear requantizer by PID coefficients to generate a PID duty cycle command, and a gain compensation unit may dynamically adjust the PID coefficients to maintain a constant control loop gain. A noise-shaped truncation unit including a multi-level error-feedback delta sigma modulator may reduce the resolution of the PID duty cycle command.

22 Claims, 12 Drawing Sheets

HARDWARE EFFICIENT DIGITAL CONTROL LOOP ARCHITECTURE FOR A POWER CONVERTER

PRIORITY CLAIM

This application claims benefit of priority of U.S. provisional application Ser. No. 60/723,282 titled "System and Method for Implementing Distributed Power Management", filed Oct. 3, 2005.

BACKGROUND OF THE INVENTION

1. Field of the Invention

This invention relates to power converters and, more particularly, to digital control loop architecture.

2. Description of the Related Art

From 1995 to 2001, the highest density processors from manufacturers such as Intel went from a power consumption rate of about 30 Watts at 3.3 V to a power consumption rate of about 90 Watts delivered at 1.5 V. A simple application of the power-voltage-current relationship reveals that the total current consumed by these chips has increased from nine amps to about 60 amps in a very short time period. There are similar analogies with all larger digital integrated circuits (ICs).

This rapid evolution has created new and significant problems in delivery of the power to and removal of waste heat from these ICs. Power supply design is now a much more critical and difficult task than it was a few years ago. High-current/low-voltage ICs require a very clean and stable source of DC power. The power source must be capable of delivering very fast current transients. The electronic path to these loads must also have low resistance and inductance (a 1.5V supply would be completely dropped across a 25 mΩ resistance at 60 Amps).

Traditionally, DC power supplies were designed to convert AC line voltage to one or more DC outputs that would be routed throughout a system to the points of load (POL). FIG. 1 is an illustration of a prior art power distribution system. As shown in FIG. 1, a power distribution scheme 100 may comprise an AC to DC converter 102 generating output voltages $V_1$, $V_2$, $V_3$, and $V_4$ that may be distributed to various POLs (point of loads). However, it may not be practical to route high-current signals throughout a system.

To overcome this difficulty, and to reduce the ill effects of distributing high current signals around a system, an alternative method of distributing power at modest voltage and current levels has been adopted. Rather than converting an AC supply voltage level to the DC voltage level required by various loads at a central location, the AC supply voltage is typically converted to a "reasonable" DC voltage and routed to the "point of load" (POL), where it is converted locally to the required low voltage. This technique is referred to as "Distributed Power Architecture", or DPA, and is illustrated in FIG. 2. As shown in PDA system 200 of FIG. 2, an AC to DC voltage converter 202 may produce an intermediate DC voltage $V_x$, which may be routed to individual local DC to DC converters 204, 206, 208, and 210, which in turn may provide the required DC voltages $V_1$, $V_2$, $V_3$, and $V_4$, respectively, to their corresponding POLs. With a DPA, errors may be reduced since the distance traveled by a high-current signal is minimized, thus reducing I×R (resistive) and L di/dt (inductive) errors.

In many power distribution systems it is typically not enough to just distribute power around a system to the various POLs. Complex electronic systems are generally monitored and controlled to ensure maximum reliability and performance. Functions (power supply features) typically implemented in DPA systems are listed below.

Supply Sequencing

A modern electronic system can contain many ICs and each IC can have several supply voltage requirements. For example, core logic may require one voltage and the I/O may require a different voltage. This typically results in a need for setting the order in which the voltages on a single chip are applied and the order in which the chips in a system are powered up.

Hot Swap

Many electronic systems, including computers, telecom racks, storage devices and battery-operated devices require "hot swap" capability. Hot swap capability typically comprises the live attachment of a device to power, i.e., attaching a device to a system that is powered up (without having to power down the system prior to the attachment). Examples of hot swap events may include installing a battery in a PDA or plugging a USB device into a computer.

Ramp Control

It is sometimes necessary to control the rate at which the DC output voltage of a converter ramps from its initial value to its nominal value. This may be done in support of managing a hot-swap event, sequencing requirement or satisfying the requirements of the load.

Voltage Programming

The final voltage presented to a load may need to be programmed to the desired value or may need to be "trimmed" to a precise value. Some systems require active voltage programming of devices during their use.

Load Monitoring

In order to maintain high reliability of an electronic system, monitoring of load status is sometimes required. Both current and voltage may need to be monitored and action may need to be taken based on the load status measurements. Current and voltage may also need to be monitored for undershoot and overshoot conditions. In some systems, when an error is detected, the system may take corrective action by switching the load off, isolating the load or just setting a system flag.

Tracking

Many times it is desirable to have the output of one more converters follow, or mirror, the output of one or more other converters in the system. Tracking a specific voltage level, for example, may include setting the voltage level of a tracking converter or device to the voltage level of a tracked converter or device, and changing the voltage level of the tracking device to match the voltage level of the tracked device any time the voltage level of the tracked device changes. In some cases the voltage levels of tracking devices and tracked devices may not be the same; changes in the tracked voltage level would simply be mirrored in the voltage output of the tracking devices. For example, if the tracked voltage increases by 0.2V, the tracking voltage would also increase by 0.2V.

Temperature Monitoring

Dense electronic systems often generate excessive waste heat. The excessive heat generally needs to be removed in order to keep the electronics operating at their safe operating temperature. Therefore, the temperature of individual loads as well as the temperature of various locations within the system's enclosure is typically monitored. When temperatures reach unacceptable limits, action may need to be taken locally and/or at the system level. Such corrective actions often include turning on or speeding up fans, setting an alarm or simply shutting down the power to the problematic load. Temperatures can be measured using several methods. Some large digital processors sometimes incorporate embedded temperature sensor diodes on chip. Other systems may employ thermistors and IC temperature sensors.

Fan Speed Control

In conjunction with temperature monitoring it is often necessary to monitor and control fan speed. This may be done to control airflow or to control acoustic noise.

Phase Control

DC voltage is typically stepped down in one of two ways, linear regulation and DC-to-DC conversion. DC-to-DC converters may step down DC voltage by pulse width modulation (PWM) of an input voltage and passive filtering of the output. The duty cycle of the PWM signal generally approximates the ratio of output voltage to input voltage divided by the efficiency of the converter. For example, for an ideal DC-to-DC converter with a desired output of 1.2V and an input of 12V, the duty cycle would be 10%. In high current applications, it is often desirable to force the various DC-to-DC converters to sample different "phases" of their clock cycle. That is, to prevent DC-to-DC converters in a system from all sampling the first 10% of a clock cycle, one converter may sample the first 10% of the clock cycle and the next converter may sample a different 10% of the clock cycle, and so on. This typically reduces noise and improves transient response. This technique is also used in motor control and is often implemented to control multiple fans in a system. PWM controlled fans with staggered phase typically offer reduced acoustic noise.

Current Sharing

In addition to forcing DC-to-DC converters to sample staggered phases of the switching clock, it is sometimes desirable to force two or more independent converters to each deliver an equal share of the load current. This approach provides improved noise and transient response in high-current applications.

Programmable Switching Frequency

Certain DC-to-DC converters feature programmable switch frequencies. Frequencies may be selected based on several system concerns.

Synchronization of Switching Clocks

It is often desirable to synchronize the switching frequency of DC-to-DC converters in a system to each other or to some other system clock. This is typically performed to reduce the probability of mixing the clock or its harmonics with important system clocks. It is of particular interest in communication applications.

There are other functions that may be required for power systems. For example, single points of temperature measurement, open/closed status of doors and vibration may be of interest.

In order to accommodate a demand for more power and denser systems and the resulting new distribution problems, many present power distribution schemes began offering multiples of each solution, or functions, in a single package. Typically each of these functions requires a separate configuration within the system. That is, each function may require its own interconnection network tying the POL converters together. The interconnection network may implement glue-logic that may be required for control of the POL converters in order for the particular function to be successfully executed during system operation. Many of these functions comprise analog signal control requiring corresponding analog signal lines, with POL converters interconnected in point-to-point configurations. Routing of such signals is often difficult, while no true communication is established between various POL converters and/or between the POL converters and any other elements of the system.

In an effort to tie all or most of these functions together at the system level, one approach has been to implement the functions in control ICs responsible for controlling respective POL converters. Some of the functionality may also be programmed into a microcontroller that may communicate with attached POL converters over an $I^2C$ (inter-IC communication) bus to coordinate control of all POL converters in the system. FIG. 3 illustrates an example of an $I^2C$-based system. As shown in FIG. 3, a microcontroller 302 may be coupled to POL converters 320, 322, 324, and 326, with the connections between the devices representing an $I^2C$ bus. A configuration as shown in FIG. 3 is typically not suited for active control and is used mainly for status monitoring, where POL converters 320, 322, 324, and 326 may send a status signal back to microcontroller 302, which in turn may send a simple control signal to a respective POL converter based on the status information received from the respective POL converter. In general, microcontroller 302 checks status for one POL converter at a time, which may be viewed as a disadvantage when more interactive, real-time communication is desired in a system.

FIG. 4 illustrates one example of a single function implemented in a DPA system. Typically, a supply controller 350 (providing control for executing the function) and DC-to-DC voltage converters 352, 354, 356, and 358 are connected in a point-to-point configuration as shown. Supply controller 350 is coupled to each DC-to-DC converter over dedicated lines, (typically analog lines are used for implementing most functions), more specifically over lines 372 and 362 to converter 352, lines 374 and 364 to converter 354, lines 376 and 366 to converter 355, and lines 378 and 368 to converter 358. Input supply voltage $V_{IN}$ 360 is coupled to each DC-to-DC converter, and in turn DC-to-DC converter 352 may produce, for a respective POL or POLs, DC output voltage 370, DC-to-DC converter 354 may produce DC output voltage 372, DC-to-DC converter 356 may produce DC output voltage 374, and DC-to-DC converter 358 may produce DC output voltage 376.

Power converters (e.g., DC-to-DC voltage converters 352, 354, 356, and 358, also referred to as POL converters) usually include error detection circuitry in the analog front end to generate an error signal based on the difference between a power converter output voltage and a reference voltage. Furthermore, power converters typically include an analog-to-digital converter (ADC) for digitizing the error signal prior to digital processing.

In most cases, conventional controller designs employ a linear ADC of 6 bits or more resolution to digitize the error signal. This number of bits results in many quantization levels (typically 64 or more), and may require good linearity around the mid-scale codes (bipolar zero for a signed output). At the same time, the ADC may need to operate at a very high sampling rate, i.e., a sampling rate at least equal to the switching frequency (which could be as high as several MHz). A typical implementation for a conventional high speed front-end ADC, for use in a digitally controlled power converter, may use a pipelined, folding/interpolating or two-step flash structure. In practice, designs such as this may consume a substantial amount of power and require a significant amount of die area, which may adversely impact power converter efficiency and manufacturing cost effectiveness.

Many other problems and disadvantages of the prior art will become apparent to one skilled in the art after comparing such prior art with the present invention as described herein.

SUMMARY OF THE INVENTION

Various embodiments are disclosed of a power converter including a hardware efficient control loop architecture. The power converter includes error detection circuitry for generating an error signal based on the difference between a power converter output voltage and a reference voltage, and an oversampling analog-to-digital converter (ADC) for digitizing the error signal. The transfer function associated with the ADC may include quantization levels spaced at non-uniform intervals away from a center code. In one embodiment, the quantization levels may be spaced at increasing powers of 2 away from the center code. In another embodiment, the quantization levels may be spaced at increasing powers of 2 away from the center code, with the exception that at least one of the quantization levels spaced at increasing powers of 2 away from the center code may be removed.

The power converter includes a digital filter for calculating the average of the digitized error signal. The power converter may also include a nonlinear requantizer for reducing the number of codes corresponding to the output of the digital filter to values that are spaced at non-uniform intervals away from a center code. In one embodiment, the nonlinear requantizer may reduce the number of codes corresponding to the output of the digital filter to values that are represented as a sum of a reduced number of powers of 2. In another embodiment, the nonlinear requantizer may reduce the number of codes to values that are spaced at increasing powers of 2 away from the center code.

The power converter may further include a proportional integral derivative (PID) unit that processes the output of the nonlinear requantizer using PID coefficients to generate a PID duty cycle command, and a gain compensation unit that dynamically adjusts the PID coefficients to maintain a constant control loop gain. More specifically, in response to gain changes in an analog front-end and/or gain changes in a power stage of the power converter, the gain compensation unit may dynamically adjust the PID coefficients to maintain a constant control loop gain. In one embodiment, the gain compensation unit may include a feed-forward gain (FFG) correction unit for measuring an input voltage to the power stage of the power converter to detect gain changes in the power stage. In this embodiment, in response to detecting gain changes in the power stage, the FFG correction unit processes the PID duty cycle command using a lookup table to maintain a constant control loop gain. In one specific implementation, the PID duty cycle command is processed using lookup table FFG correction constants that are encoded in Canonic Signed Digit (CSD) ternary form. Furthermore, in some embodiments, the power converter may include a noise-shaped truncation unit including a multi-level error-feedback delta sigma modulator for reducing the resolution of the PID duty cycle command.

Figure 1:
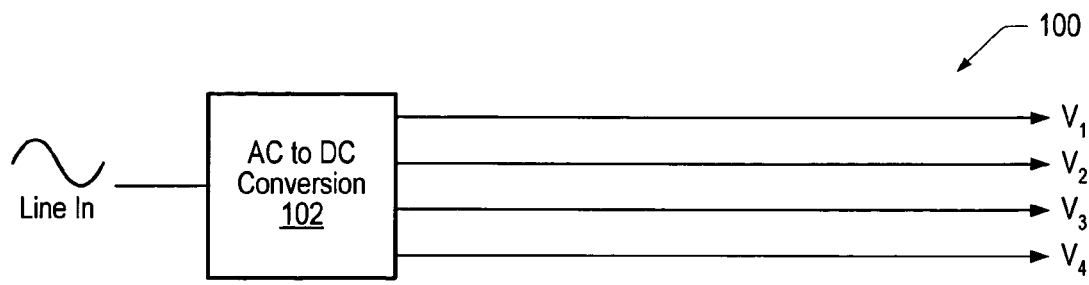
FIG. 1 is a prior art power distribution circuit.
Figure 2:
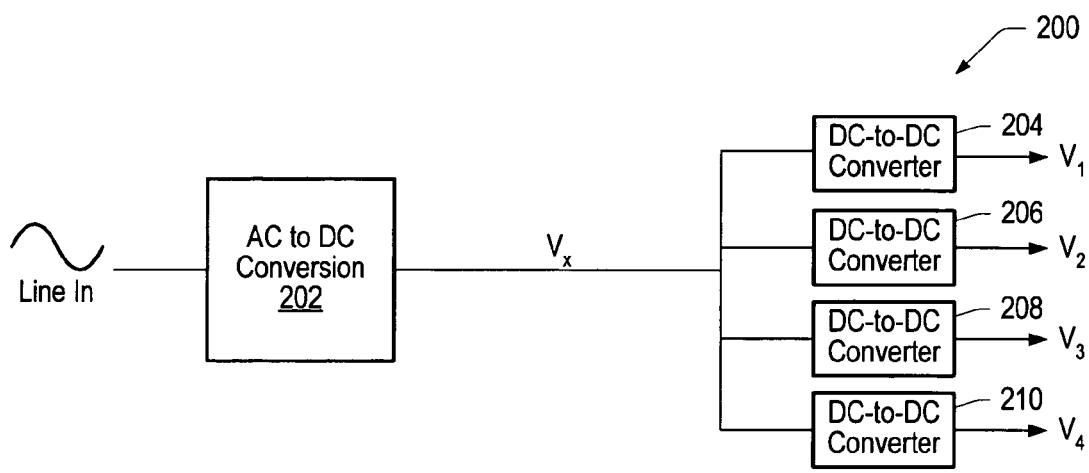
FIG. 2 is a prior art distributed power architecture (DPA)
Figure 3:
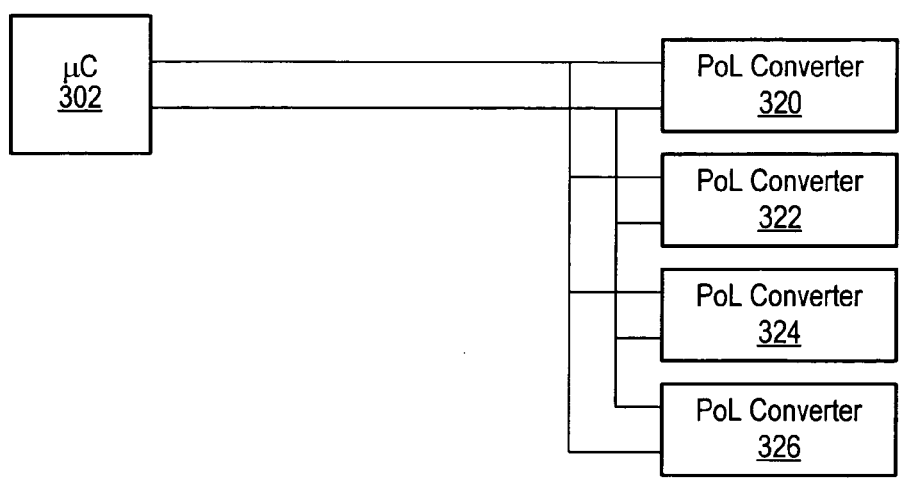
FIG. 3 is a prior art system wherein a microcontroller communicates with POL converter devices over an PC bus.
Figure 4:
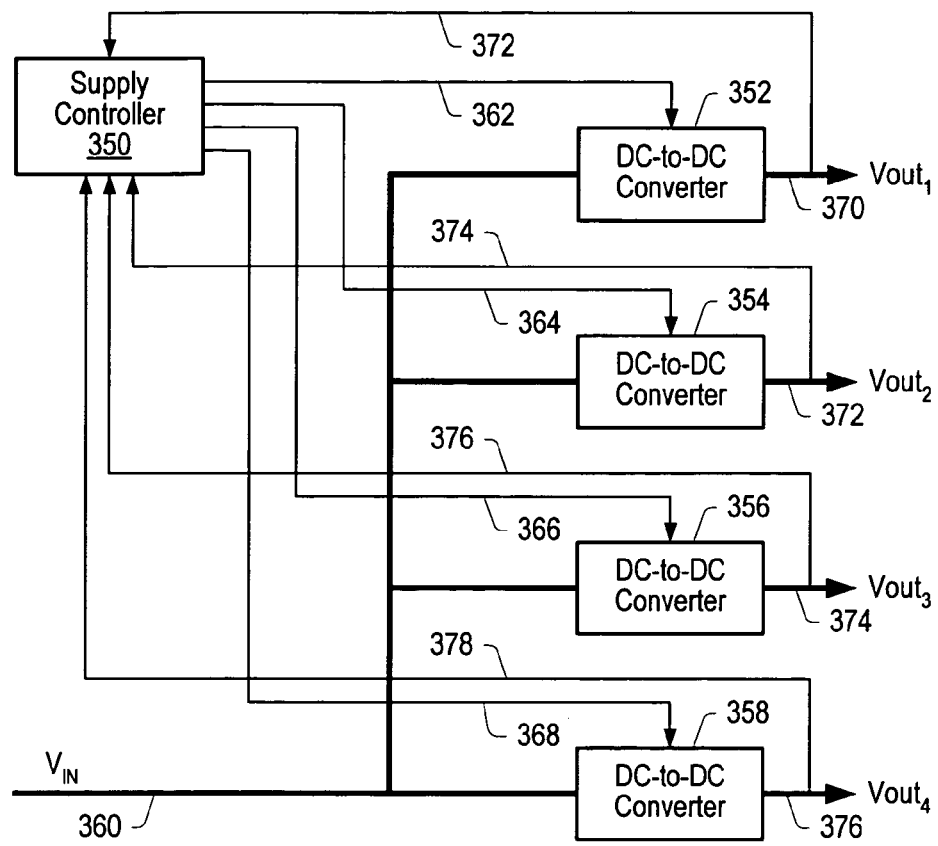
FIG. 4 is a prior art system wherein DC-to-DC voltage converters are interconnected in a point-to-point configuration, controlled by a central supply controller to perform a specific function.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION

The following references are hereby incorporated by reference in their entirety as though fully and completely set forth herein:

U.S. Patent Application Publication No. 2004/0201279 (Ser. No. 10/820,976), titled "Method And Apparatus For Improved DC Power Delivery, Management And Configuration," filed Jun. 21, 2004.

U.S. patent application Ser. No. 11/198,698, titled "Method For Using a Multi-Master Multi-Slave Bus For Power Management," filed Aug. 5, 2005.

Power Distribution System

Figure 5:
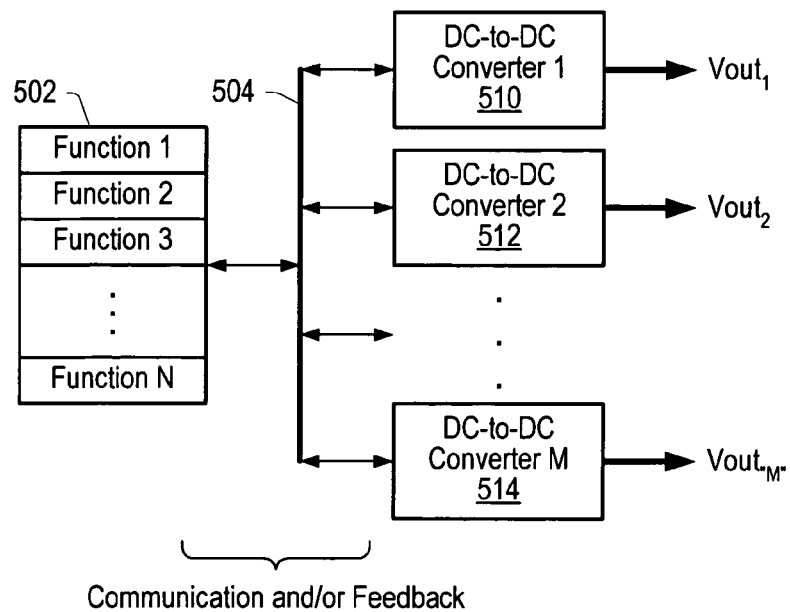
FIG. 5 is a block diagram of one embodiment of a system for improving DC power delivery, management, and configuration.

FIG. 5 is a block diagram of one embodiment of a power distribution system. As shown, the common functions required in a complex DC power system may be combined in a single controller rather than treated as separate IC functions. As illustrated in the embodiment of FIG. 5, a controller 502 managing functions 1 through N may be coupled to DC-to-DC converters 1 through M (illustrated by example as power converters 510, 512 and 514) via a digital bus 504. Digital bus 504 may be a serial bus enabling communication with reduced wiring requirements. In the configuration shown in FIG. 5, real-time communication is made possible between power converters 510, 512, and 514 and controller 502 by their being coupled to serial digital bus 504. It is noted, however, that in other embodiments the power converters may communicate with the controller 502 and with each other by other means, e.g., a parallel bus.

Figure 6:
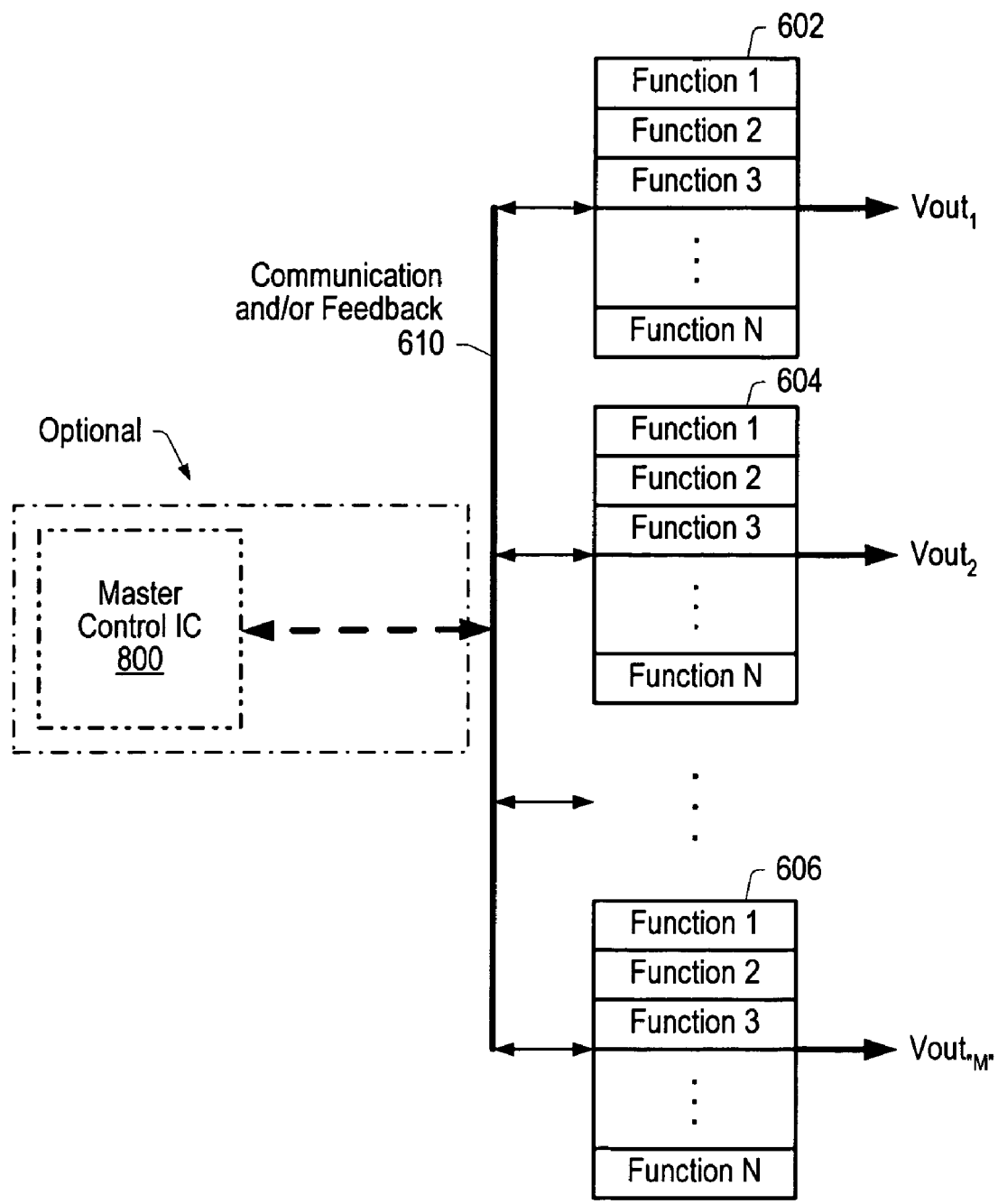
FIG. 6 is a block diagram of one embodiment of a system including digital power management devices (DPMDs)

The illustrated embodiment of FIG. 6 provides a system-oriented solution using mixed-signal IC technology, allocating one unit of each function to a single point of load (POL) IC, or digital power management device (DPMD). In this embodiment, one DC-to-DC voltage converter, one unit of supply sequencing, one unit of load monitoring, and one respective unit of various other functions (previously discussed) are combined in each DPMD, e.g., in each of DPMD 602, DPMD 604, and DPMD 606.

As illustrated in the embodiment of FIG. 6, DPMDs 602, 604, and 606 have each been allocated Functions 1 through N, and are coupled together via serial digital bus 610. Bus 610 may be simpler than an I²C bus and may offer more control and signaling, including real-time data feedback capability. Bus 610 may also allow each DPMD to be coupled to a master control IC (MCIC) 800, or to be coupled only to each other, enabling all system level functions to be configured, controlled and monitored providing simple and flexible results. MCIC 800 is shown mostly for illustrative purposes, and preferred embodiments may omit MCIC 800 and only include DPMDs coupled to bus 610, where all required functions may be controlled by a single DPMD or a group of DPMDs operating together. By configuring each POL device or DPMD to have the ability to communicate with any other POL device or DPMD coupled to bus 610, each POL device or DPMD may act as either a master or a slave on bus 610, thereby obviating the need for MCIC 800 where it may be desirable to design a power delivery system without MCIC 800, or without any other similar central control unit.

Various embodiments, as illustrated in FIG. 6, provide a modular approach to designing DPA systems, providing system level functionality without requiring the system to be individually and separately configured for each desired function that may be required. Each DPMD may be individually configured prior to its being placed in the system, and may operate to perform all necessary functions by having access to real-time feedback information over bus 610, and by communicating with other DPMDs. This represents active control as opposed to simple status monitoring. Several devices may be enabled when the DPA system is configured as illustrated in the embodiment FIG. 6. Rather than just having a DC-to-DC converter, a DPMD may comprise a DC-to-DC converter, and any or all of the associated control, configuration and monitoring functions associated with a single node. Furthermore, in some embodiments, each DPMD of FIG. 6 and/or each power converter of FIG. 5 may include a hardware efficient control loop architecture, as will be further described below with reference to FIGS. 7–14.

Power Converter

Figure 7:
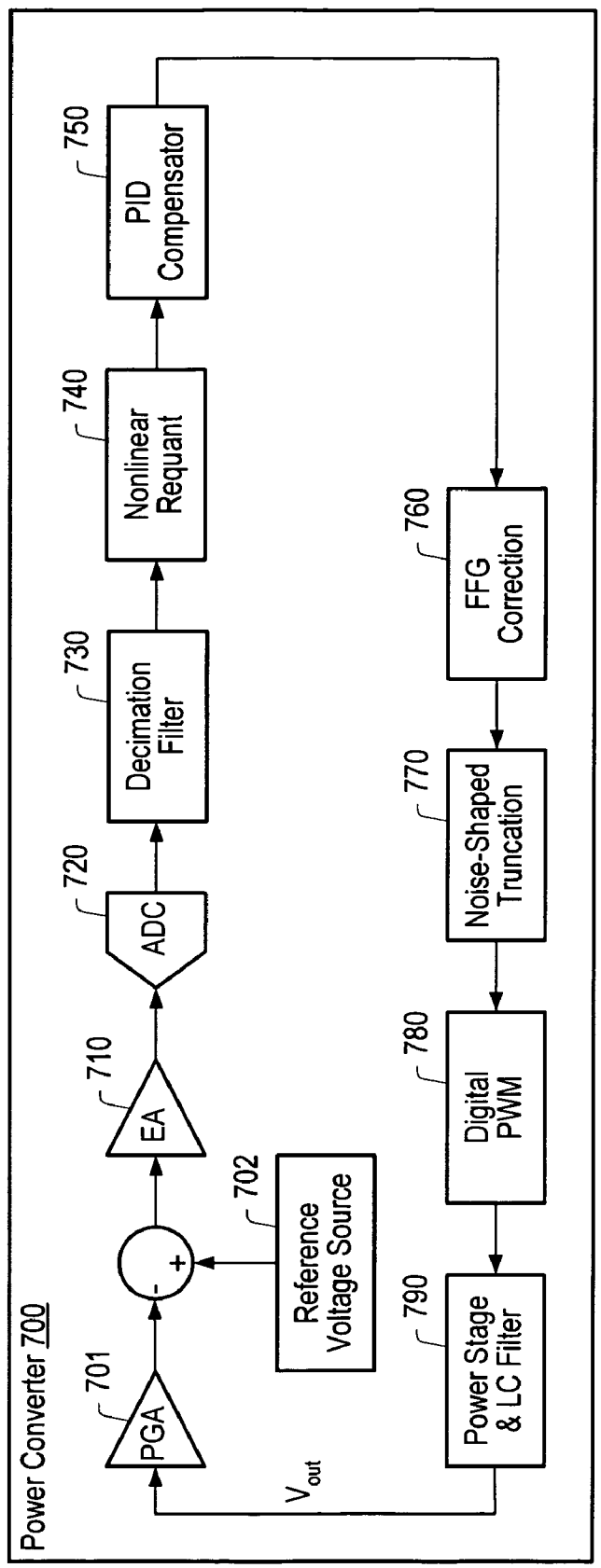
FIG. 7 is a block diagram of one embodiment of a power converter.

FIG. 7 is a block diagram of one embodiment of a power converter 700. In one specific implementation, the power converter control loop is formed as shown in the embodiment of FIG. 7. Power converter 700 may be configured as a voltage-mode switching power converter having a hardware efficient digital control loop architecture. In this embodiment, power converter 700 includes a front-end error signal analog-to-digital converter (ADC) 720, which may employ a reduced hardware nonlinear flash architecture and high rate oversampling. ADC 720 may be followed by a decimation filter 730 and a nonlinear requantizer 740, which may eliminate the need for hardware multipliers in Proportional Integral Derivative (PID) compensator 750.

Furthermore, power converter 700 may include a noise-shaped truncation (NST) unit 770, which may implement a word-length reduction technique based on higher-order truncation error noise-shaping. The word-length reduction technique may lower the number of bits in the calculated PID duty-cycle command, and may allow the use of a lower resolution Digital Pulse Width Modulator (D-PWM), e.g., D-PWM 780. This power converter control loop architecture may reduce the overall hardware complexity without compromising control loop performance. It is noted that in various embodiments power converter 700 may be configured as a DC-to-DC converter, a digital power management device (DPMD), an AC-to-DC converter, among others, and may be included in numerous types of power distribution systems, e.g., in one or more of the systems illustrated in FIGS. 1–6.

As depicted in the embodiment of FIG. 7, power converter 700 may also include FFG correction unit 760 and a power stage/LC filter 790. In addition, the analog front-end of power converter 700 may include a programmable gain amplifier (PGA) 701, an error amplifier (EA) 710, and a reference voltage source 702. PGA 701 reduces errors introduced by reference voltage source 702 and error amplifier 710. In one specific implementation, a control unit of power converter 700 may adjust the PGA gain in order to use as much of the available dynamic range of the circuitry as is practical for a given output voltage. It should be noted that the components described with reference to FIG. 7 are meant to be exemplary only, and are not intended to limit the invention to any specific set of components or configurations. For example, in various embodiments, one or more of the components described may be omitted, combined, modified, or additional components included, as desired.

During operation, error amplifier 710 may generate an error signal based on the difference between the power converter output voltage and a reference voltage. It is noted that the power converter output voltage may be the output signal ($V_{out}$) from power converter, or a scaled version thereof. For example, in one specific implementation, an attenuator circuit (e.g., a resistor divider) may attenuate the power converter output voltage. In this specific implementation, error amplifier 710 may generate an error signal based on the difference between the attenuated power converter output voltage and a reference voltage. The reference voltage may be provided by reference voltage source 702. Reference voltage source 702 may be a target digital-to-analog converter (DAC) that generates the desired reference voltage in response to receiving a predetermined step size.

Error amplifier 710 provides the error signal to ADC 720 to be digitized before further processing. It is noted, however, that in other embodiments other types of error detection circuitry may process the power converter output voltage and generate the error signal.

Oversampling Error ADC

ADC 720 may employ a dramatically reduced number of quantization levels without compromising the overall dynamic performance. ADC 720 may retain a restricted linear range around the zero-error bin (e.g., center code "0" in a signed 2's complement ADC), while still offering adequate large signal performance comparable to more complex linear binary digitizers. Additional benefits may be obtained by operating ADC 720 faster than Nyquist (i.e. using oversampling). By oversampling ADC 720, a digital decimation filter may be used (i.e. down-sampling and low-pass filtering), which may eliminate the need for a more complex analog anti-aliasing filter.

Figure 8:
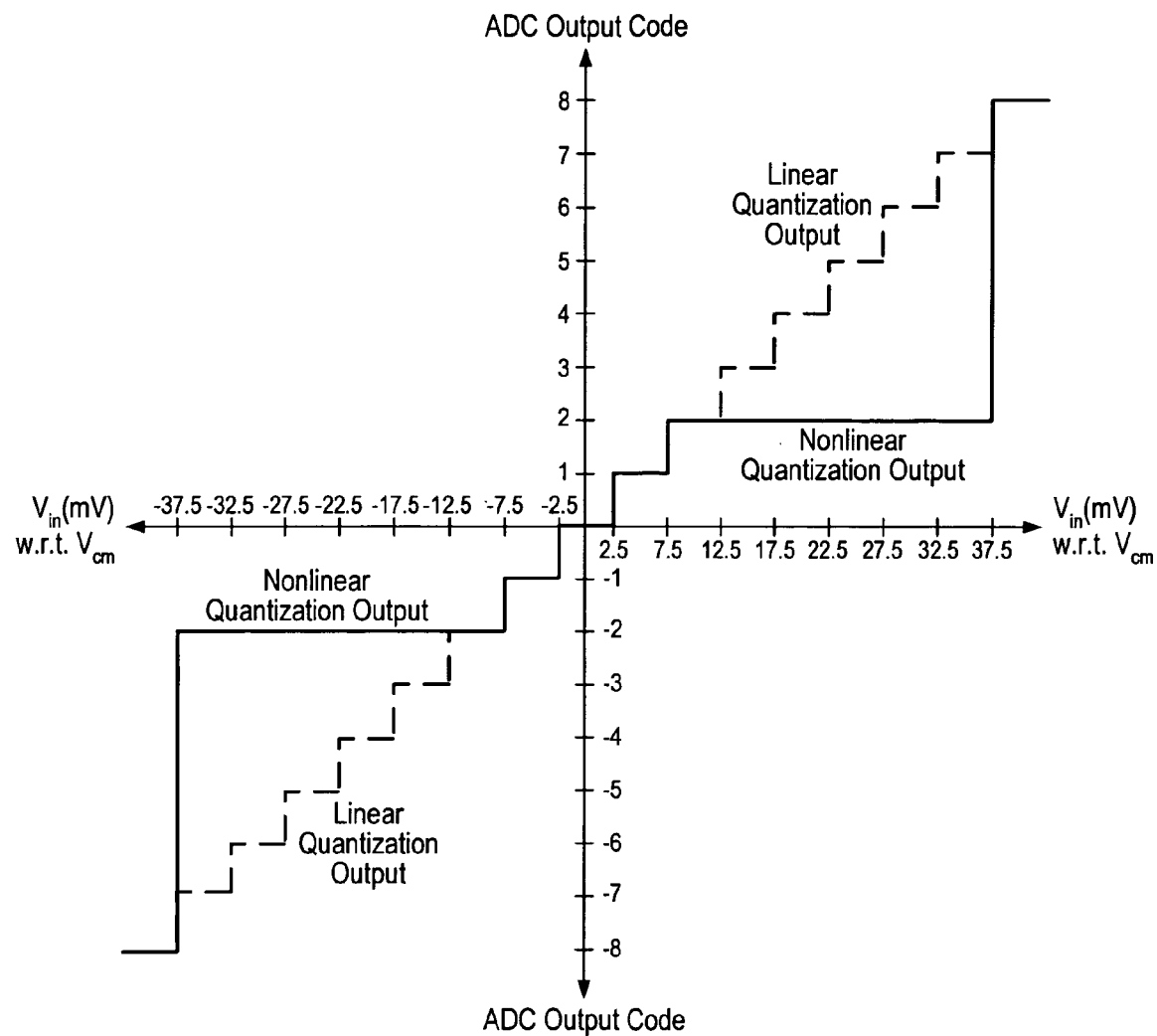
FIG. 8 illustrates one example of a transfer function that may be associated with an error ADC of the power converter, according to one embodiment.

FIG. 8 illustrates one example of a transfer function that may be associated with ADC 720, according to one embodiment. Removal of most of the linear quantization steps (represented by the dashed line in FIG. 8) that are typically included in a conventional ADC transfer function, above and below some predetermined range and centered around the zero error bin (e.g., +/−1, 2, 3, etc.), may enable a hardware complexity reduction. Instead, the transfer function includes quantization levels spaced apart at non-uniform intervals away from a center code (e.g., center code "0").

In one embodiment, the non-uniform quantization levels are spaced apart at increasing powers of 2 (i.e. 0, +/−1, 2, 4, 8, 16, 32, etc.) away from the center code. In some embodiment, as shown in FIG. 8, one or more of the quantization levels spaced apart at increasing powers of 2 may be removed, without markedly affecting the small signal settling behavior of the control loop. For example, in the example of FIG. 8, the "4" quantization level (i.e., $2^2$) is missing. This technique may be extended to a multiplicity of nonlinear power of 2 quantization levels, with some being present and others not.

Figure 9:
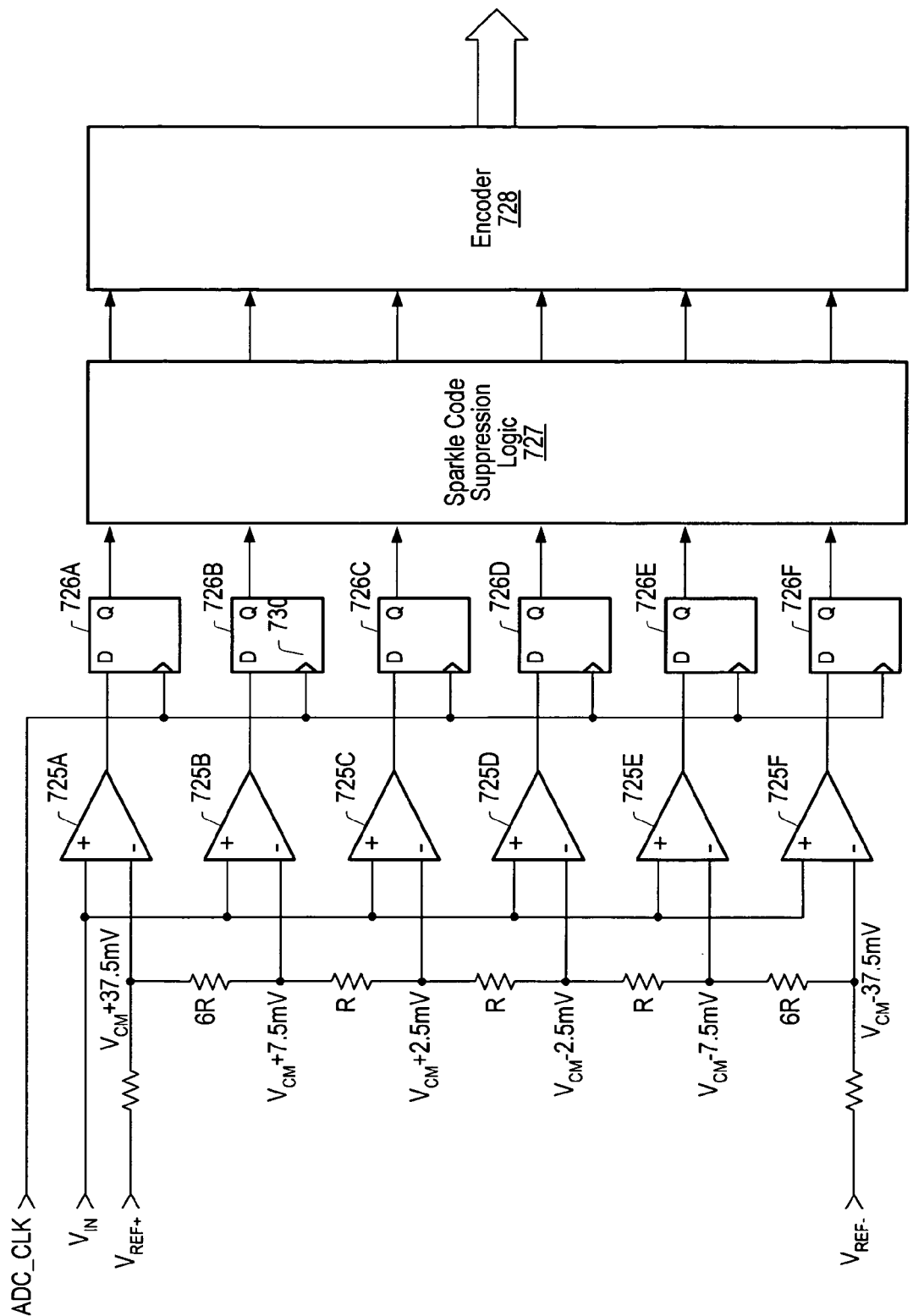
FIG. 9 is a block diagram of one embodiment of the error ADC.

FIG. 9 is a block diagram of one embodiment of ADC 720. As described above, the transfer function associated with the design of ADC 720 includes quantization levels spaced apart at non-uniform intervals away from a center code. ADC 720 may include a plurality of resistors R, comparators 725A–725F, flip-flops 726A–726F, sparkle code suppression logic 727, and encoder 728. In the specific implementation illustrated in FIG. 8 and FIG. 9, the quantization levels are at −8, −2, −1, 0, 1, 2, 8; however, it is noted that in other embodiments the specific design of the ADC may be changed and the quantization levels may be at other locations spaced at non-uniform intervals away from a center code.

The sparse nonlinear flash ADC implementation may simplify the front-end design, because it minimizes the number of analog comparators. In the specific implementation shown in FIG. 8 and FIG. 9, the output codes (−8, −2, −1, 0, 1, 2, 8) are generated by 6 comparators (comparators 725), sparkle code suppression logic 727, and encoder 728. More specifically, sparkle code suppression logic 727 captures the comparator results with respect to $V_{REF}$ and $V_{IN}$ and corrects for sparkle code errors, and encoder 728 encodes the result into a digital word. Additionally, in this implementation, the quantization level equal to +/−4 has been removed to save two comparators, by skewing the reference voltage divider between the inner four and outer two comparators using the six R resistors (or a 6R resistor).

In other embodiments, the design of ADC 720 may be modified in a similar fashion if additional quantization levels are removed, or two comparators and the supporting circuitry may be added to the design if no quantization levels are removed. It is noted that in some embodiments by implementing this architecture the arithmetic operations downstream in the power converter control loop are simplified, since only power of 2 data values from ADC 720 may need be accommodated.

Decimation Filter

The digital output of ADC 720 may be oversampled at some multiple of the converter switching frequency ($F_{sw}$). In order to drive the PID compensator 750 operating at the basic switch rate, the ADC output may need to be digitally downsampled by an FIR decimation filter 730. Decimation filter 730 may also be used to digitally low-pass filter the ADC data.

In one embodiment, decimation filter 730 may have a relatively short impulse response and low group delay. The low group delay, e.g., of approximately ½ a switching period, may be necessary to maintain low excess phase shift in the digital feedback loop. This may help ensure that the phase and gain margins of the loop are not adversely affected by the additional insertion delay of decimation filter 730. Furthermore, in one embodiment, the filter response may have zeros located at multiples of the switch rate. This may help ensure that harmonics of the switch rate, and the adjacent noise bands centered on these harmonics, are rejected as much as possible before subsequent processing of the error signal. One benefit of this feature is that it may minimize potential synchronous switching interference from the power stage 790, which may adversely affect small signal control loop operation.

Figure 10A:
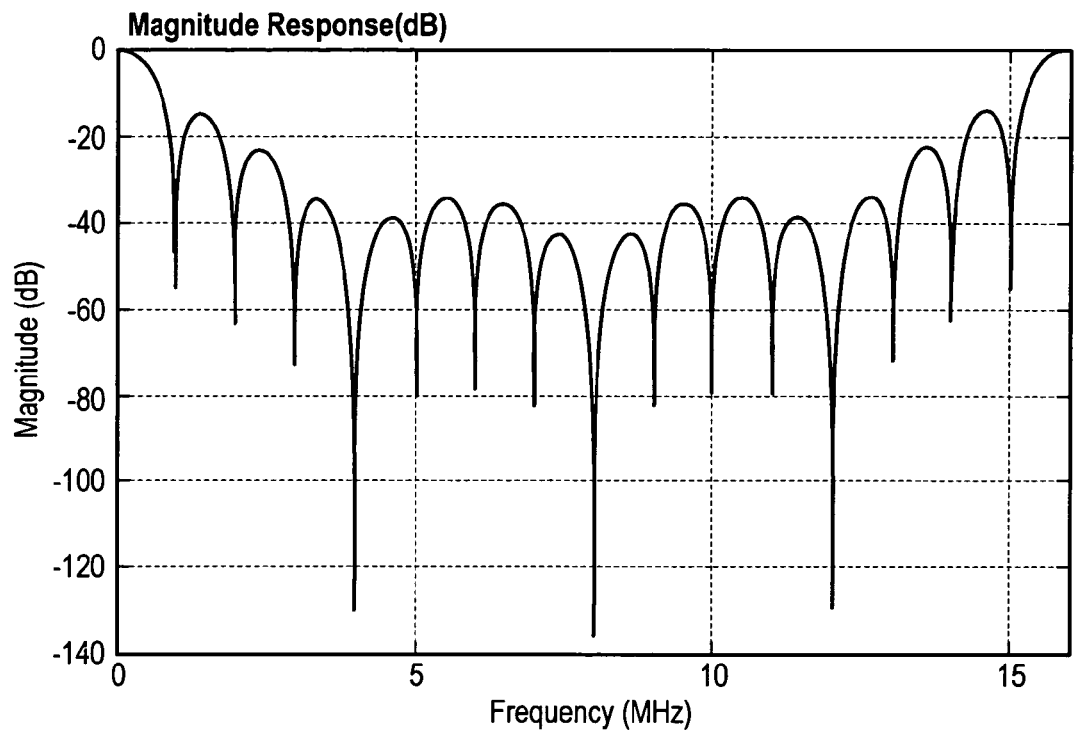
FIG. 10A illustrates a normalized decimation filter magnitude response, according to one embodiment.
Figure 10B:
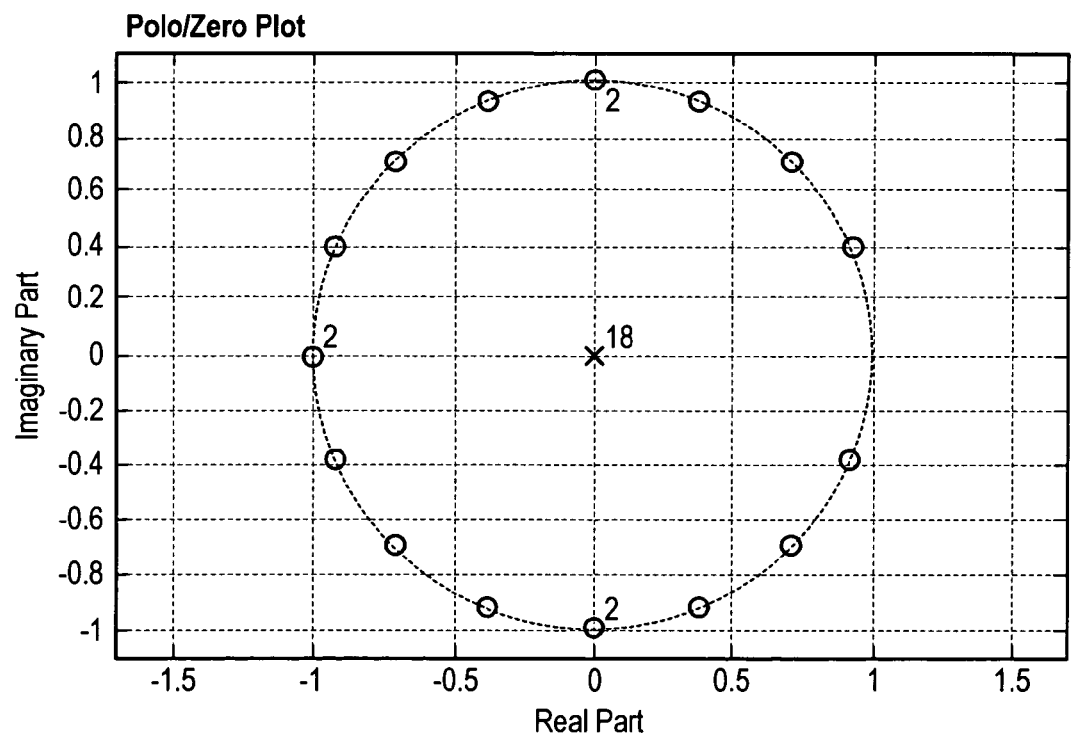
FIG. 10B illustrates a decimation filter pole-zero plot, according to one embodiment.

In some embodiments, a modified moving average filter with 19-tap triangularly-weighted endpoint impulse response may be used. In one specific implementation, the impulse response coefficients (e.g., 1, 2, 3, 4, 4, 4, 4, 4, 4, 4, 4, 4, 4, 4, 4, 4, 3, 2, 1) may be chosen such that the filter has a DC gain of 64, which is an exact power of 2. FIG. 10A illustrates a normalized decimation filter magnitude response for an input sampling rate of 16 MHz, when the converter switching frequency ($F_{sw}$) is 1 MHz, according to one embodiment. Note the nulls at multiples of 1 MHz. FIG. 10B illustrates a decimation filter pole-zero plot, which shows filter zeros at multiples of $F_{sw}$, according to one embodiment. Note the double zeros at 4* $F_{sw}$, 8* $F_{sw}$ and 12* $F_{sw}$. In this specific implementation, the group delay of this filter when used to downsample the 16× oversampled input, may be 9/16 that of an $F_{sw}$ switching period. It is relatively easy to accommodate the numerical effects of this delay, along with other signal processing propagation delays, in the overall compensation design software for the control loop.

It is noted, however, that in other embodiments power converter 700 may include other types of digital filters. Various other filter impulse responses which result in a low-pass characteristic, and zeros at multiples of $F_{sw}$ may be employed, e.g., a classical moving average design with unity-weighted coefficients.

Nonlinear Requantizer

Since decimation filter 730 typically re-introduce non-factor of 2 codes into the error signal, the output of decimation filter 730 is passed through a nonlinear digital requantizer 740, which reduces the number of codes to values that are powers of 2. For example, requantizer 740 may force the error signal to assume only bipolar values that are exact powers of 2 (i.e. 0, +/−1, 2, 4, 8, 16, 32, 64, etc.).

This requantization of the error signal may simplify computations that are performed in PID compensator 750, as will be described further below.

Figure 11:
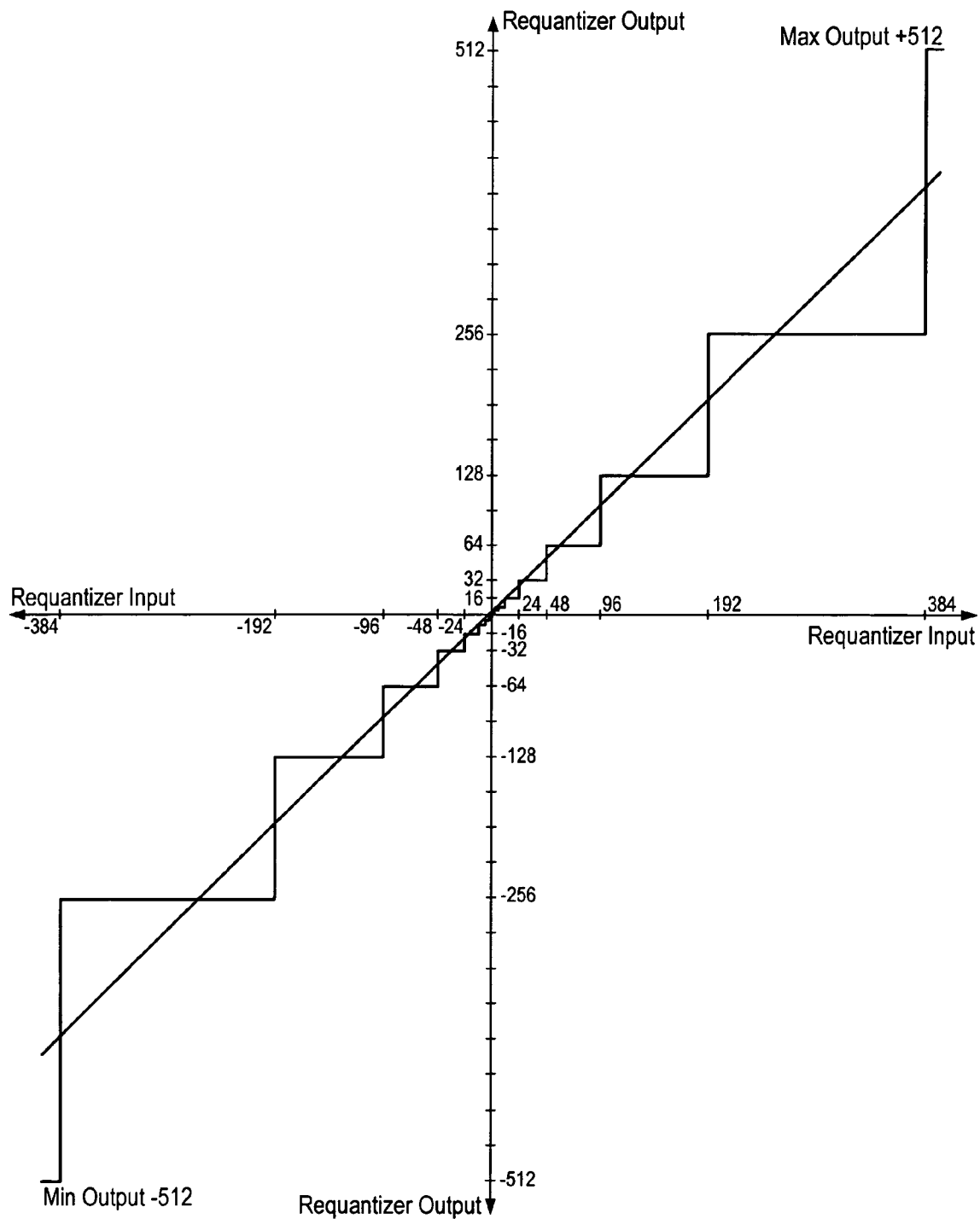
FIG. 11 illustrates requantization of the error signal to reduce the number of input codes, according to one embodiment.

The maximum value of the error signal following decimation filter 730 may be equal to the peak value of the ADC error signal output in saturation (e.g., +8 or −8 in the implementation shown in FIGS. 8 and 9), multiplied by the DC gain of decimation filter 730 (e.g., 64). FIG. 11 illustrates the requantization of the error signal, according to one embodiment, which serves to reduce the number of input codes to a significantly smaller set. Note that each code is solely a power of 2. In one embodiment, as depicted in FIG. 11, the transition point for the requantizer output to step to the next higher level may be an input code that is mid-way between adjacent output quantization levels. In other words, the input codes may be rounded to the nearest power of 2, i.e., $2^n$, where n is an integer. It is noted, however, that in other embodiments the input codes may be rounded to the nearest power of 2 by other methods, e.g., round to the first power of 2 above the particular input code.

In one example, an 11-bit two's complement input representation from decimation filter 730 with a range of −512 to +512, or 1025 distinct input values, is reduced to only 21 output values (−512, −256, −128, −64, −32, −16, −8, −4, −2, −1, 0, 1, 2, 4, 8, 16, 32, 64, 128, 256, 512). In this example, the requantized output codes that fall below +64 and above −64 represent fractional LSBs of ADC 720, since the DC gain of decimation filter 730 is 64. These codes may serve to enhance the overall DC characteristics of the digital control loop, such that the achievable set-point accuracy is actually better than 1 LSB of ADC 720.

In some embodiments, requantizer 740 may reduce the number of codes corresponding to the output of decimation filter 730 to additional values that are spaced at non-uniform intervals away from a center code. For example, in addition to values that are exact powers of 2 (e.g., in binary form: 0001, 0010, 0100, and 1000), also values that can be represented as a sum of a reduced number of powers of 2 (e.g., in binary form: 1001, 0110, 0101, and 1100). Values that can be represented as a sum of a reduced number of powers of 2 may be defined as values that can be represented as a sum of at most two powers of 2 (e.g., in binary form: 0101, or $2^0+2^2$=code '5'). It is noted, however, that in other embodiments requantizer 740 may generate other values that are at non-uniform intervals away from a center code.

PID Compensator

Figure 12A:
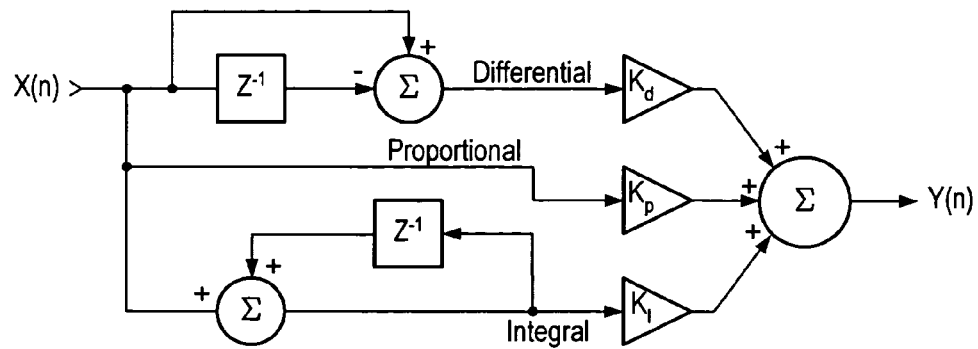
FIG. 12A is a block diagram of one embodiment of a PID compensator.

PID compensator 750 may be a DSP engine that first generates a Proportional, an Integral and a Differential signal based on the received error signal X(n) from requantizer 740, and then sums the signals from the Proportional, Integral, and Differential signal paths, as depicted in the embodiment of FIG. 12A. Specifically, PID compensator 750 generates two z-domain zeros (either real, or, complex conjugate) and a single pole at DC. In some embodiments, an indirect form of the PID algorithm with coefficient scaling may be used to simplify the computational hardware, as shown in FIG. 12B, where:

$K_A = K_i + K_p + K_d$ $K_B = -(K_p + 2K_d)$ $K_C = K_d$ $$H(z) = \left[\frac{K_A + K_B z^{-1} + K_C z^{-2}}{1 - z^{-1}}\right] * \left(\frac{64}{PGA}\right)$$

Figure 12B:
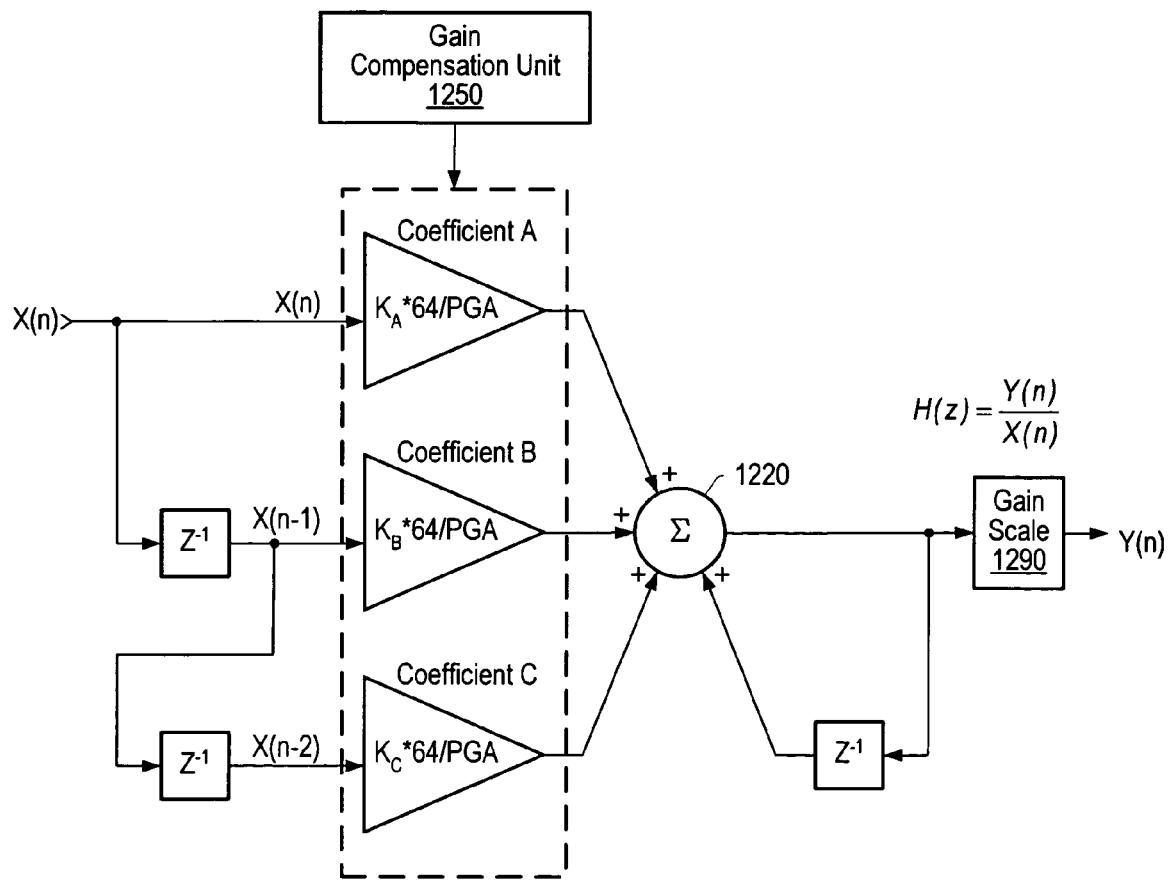
FIG. 12B is a block diagram of another embodiment of a PID compensator.

In the embodiment shown in FIG. 12B, PID coefficients A, B, and C are "multiplied" with the requantized error signal after passing through the appropriate unit sample delays, and the resulting terms are accumulated with the previous integrator output state by PID accumulator 1220. By performing these operations once per switching period, PID compensator 750 forms the raw duty-cycle command for the next PWM cycle.

Furthermore, as illustrated in the embodiment of FIG. 12B, PID compensator 750 includes a gain compensation unit 1250, which compensates for the gain corresponding to PGA 701 in the PID coefficients A, B, and C, to make the overall control loop independent of the front-end gain settings. For example, the PGA gain may be compensated by a multiplying the PID coefficients by an amount equal to the reciprocal of the PGA gain.

In one embodiment, in response to changes in the gain corresponding to the analog front-end of power converter 700 (e.g., PGA 701), gain compensation unit 1250 dynamically adjusts the PID coefficients to maintain a constant control loop. For example, in response to a gain change, gain compensation unit 1250 recalculates the reciprocal of the PGA gain and multiplies the PID coefficients by this recalculated amount. In another example, the PID coefficients may be adjusted at regular intervals. It is noted that gain compensation unit 1250 may be implemented with software and/or hardware. It is further noted that in other embodiments gain compensation unit 1250 may dynamically adjust the PID coefficients by other methods.

Figure 12C:
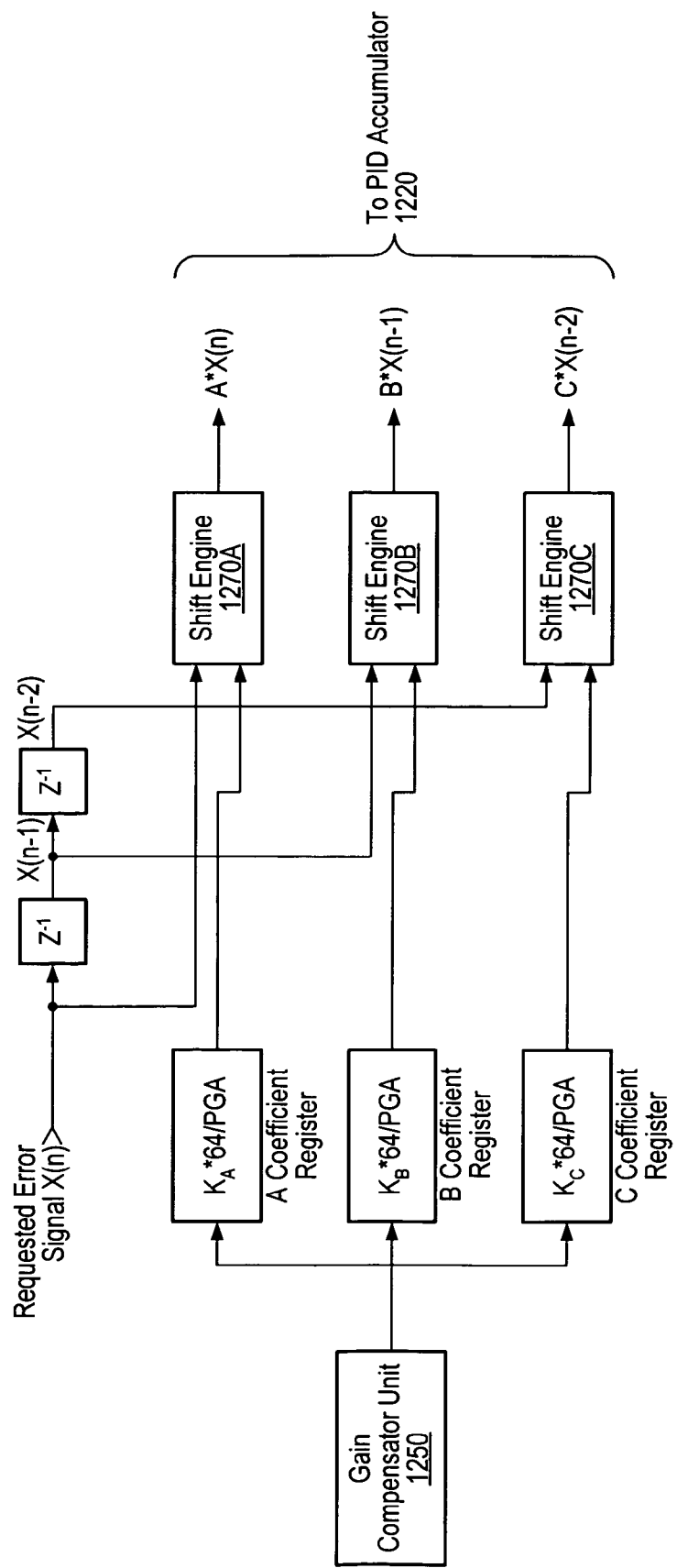
FIG. 12C is a block diagram of one specific implementation of the PID compensator of FIG. 12B.

Since the initially calculated PID coefficients will typically have a fractional component that needs to be accommodated, especially for low loop crossover frequencies, PID compensator 750 may include a method for representing this fraction efficiently. Six fractional bits (with a quantization step size of 1/64) usually give reasonably good accuracy in placing the compensator zeroes close to DC, for low unity loop-gain crossover frequencies. In one embodiment, as illustrated in the embodiment of FIGS. 12B and 12C, to eliminate fractional data in PID compensator 750, an additional gain of 64 may be pre-factored into the PID coefficients. Then, the gain may be corrected following the duty cycle calculations further downstream (along with the decimation filter gain of 64).

In order to accommodate PID coefficients of widely varying magnitude, especially after gain correction, it is common to use a dedicated hardware multiplier to compute the product of the PID coefficients and the error signal values. The inclusion of a hardware multiplier in common designs may lead to both a significant area and power consumption penalty, as it is typically a large complex digital block. In the implementations described in the previous sections, if the error signal's representation has been requantized to a power of 2, it becomes significantly easier to facilitate multiplication of the PID coefficients by the error signal. In these implementations, the design of PID compensator 750 may be substantially simplified, because the multiplication of any number by a positive power of 2 amounts only to shifting the original binary representation left, by a number of places equal to the value of the exponent. As such, in various embodiments, the design of PID compensator 750 may be simplified by replacing a dedicated hardware multiplier with a much simpler programmable hardware shifter engine.

FIG. 12C illustrates a block diagram of one specific implementation of PID compensator 750 of FIG. 12B, including a plurality of programmable hardware shift engines 1270A–C. In this implementation, the shift engine data inputs are equal to the predetermined PID coefficients, and the shift operations are controlled by the requantized error signal X(n), or a delayed version. As depicted in the embodiment of FIG. 12C, gain compensation unit 1250 may update the PID coefficients A, B, and C stored in A, B, and C coefficient registers, respectively, as described above. It is noted, however, that in other embodiments, if a shift engine 1270 is designed to be fast enough from a hardware perspective, it may be multiplexed three ways between the A, B and C coefficient registers enabling even further hardware reduction.

Gain scale unit 1290 may be connected at the output of PID compensator 750 to correct for the DC gain of the decimation filter (e.g., 64) and the pre-factored gain in the A, B and C coefficients (e.g., 64). In one example, a scaling factor of 1/2048 is used. In another example, a factor of 1/4096 is used to take an additional gain boost of 2 in this stage, since it does not significantly impact loop phase or gain margins in a negative manner. In one embodiment, gain scale unit 1290 is programmable, e.g., with a range of 1/256 to 1/16384, to facilitate additional design space exploration with variable loop gains.

Feed-Forward Gain Correction

Gain compensation unit 1250 may also implement a feed-forward gain correction technique to compensate for the gain corresponding to power stage 790 in the PID coefficients A, B, and C, to make the overall control loop independent of the power stage gain. In one embodiment, regular measurements of the power stage line input $V_{in}$ may be performed, and in response to changes in the power stage gain as $V_{in}$ is varied, gain compensation unit 1250 dynamically adjusts the PID coefficients to maintain a constant control loop. Since the PID coefficients may be computed at some specific nominal power stage voltage (e.g., a typical value of $V_{nom}$ is 5V), then a correction factor of $V_{nom}/V_{in}$ may be applied to keep the overall control loop gain constant and independent of $V_{in}$. Failure to do so may result in loss of loop phase and gain margin at high values of DC line input voltage, thus leading to poor small-signal settling response and, ultimately, instability. It is noted that gain compensation unit 1250 may be implemented with software and/or hardware. It is further noted that in other embodiments gain compensation unit 1250 may dynamically adjust the PID coefficients by other methods.

Feed-forward gain correction usually involves a reciprocal arithmetic operation, which may be performed in near real-time, such that the duty cycle command actually tracks rapid variations of $V_{in}$ on the fly. When feed-forward gain correction is implemented in hardware, real-time reciprocation typically implies the need for some sort of a hardware divider, which results in die area and power consumption penalties. In a hardware implementation described below with reference to FIG. 13, feed-forward gain (FFG) correction unit 760 includes a mechanism that simplifies the hardware necessary to perform feed-forward gain correction. It is noted that in some embodiments, feed-forward gain correction may be implemented in software, which may be executed by a processing unit of power converter 700, e.g., via gain compensation unit 1250. In these embodiments, the hardware components of FFG correction unit 760 may be omitted.

Figure 13:
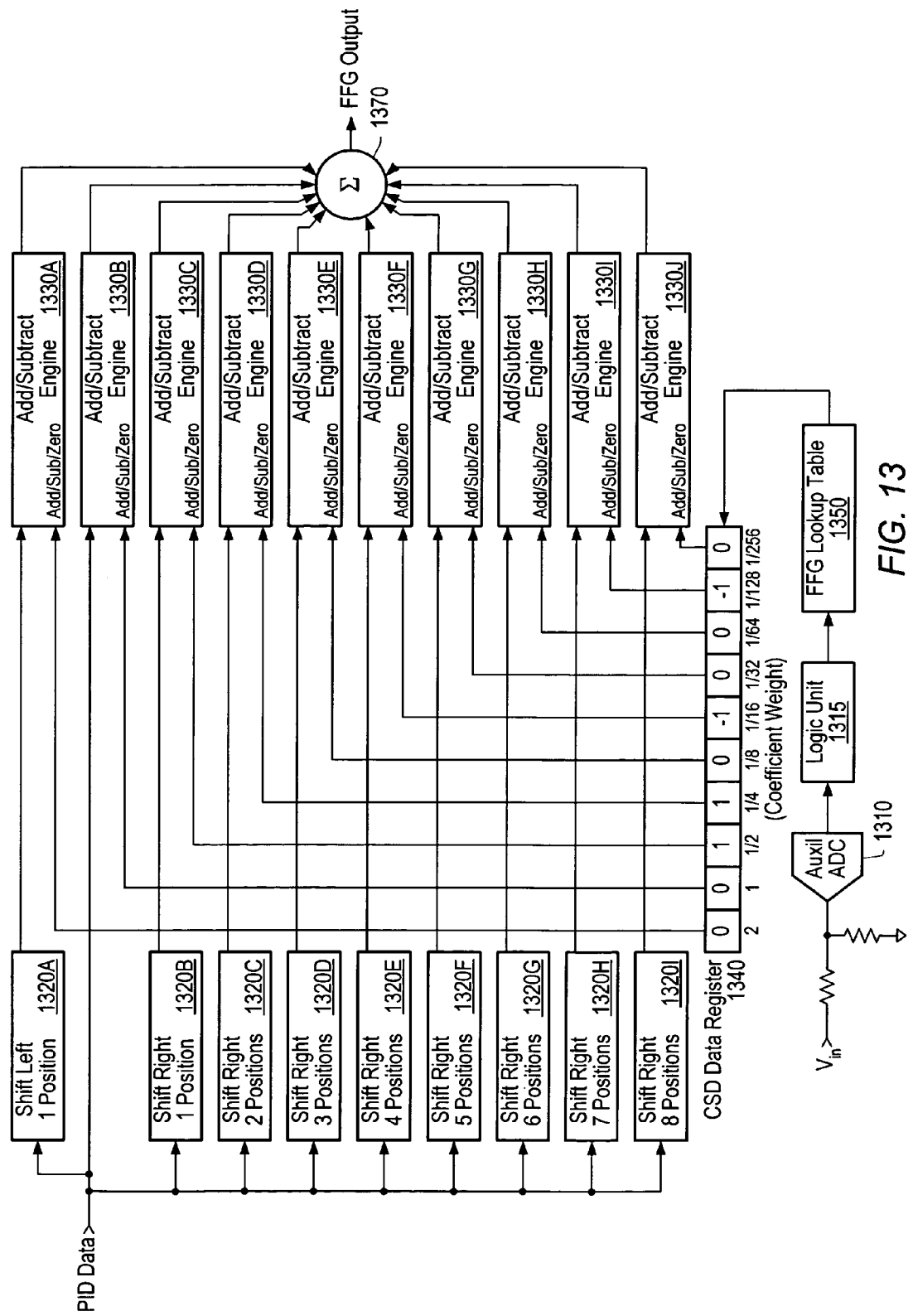
FIG. 13 is a block diagram of one embodiment of a feed-forward gain (FFG) correction unit.

FIG. 13 illustrates a block diagram of one embodiment of FFG correction unit 760. To correct for $V_{in}$ variation digitally, a scaled version of the input power supply voltage ($V_{in}$) may be measured by an additional auxiliary system ADC 1310 (e.g., with input scale factor $K_{SF}$). Then, the digitized signal may be further processed, e.g., resampled, by logic unit 1315. Once a digital representation of the scaled $V_{in}$ has been obtained, a subset of the auxiliary ADC's most-significant bits (MSB) may be used to index into a lookup table 1350, which contains pre-computed FFG correction factors. As the digital representation for $V_{in}$ changes, so does the value obtained from the lookup table 1350. In one specific implementation, if a 64-entry lookup table is used, which may require only the upper six MSBs from the auxiliary ADC 1310 as an index address, a new FFG correction factor may be retrieved whenever the digitized value of $V_{in}$ changes by more than:

$$\Delta V_{in} = \frac{FSR}{(K_{SF}*64)}$$

FSR=Auxiliary ADC full scale input range

KSF=$V_{in}$ resistive voltage divider ratio

During operation, an updated correction factor is chosen before the loop gain increases by too large an amount, as this could lead to closed loop instability. The actual step size used determines how much the digital loop gain will change before a new table entry is retrieved to return it to the nominal value. In one specific implementation, a wide FFG correction range of 0–20V is obtained with reasonably good step size granularity of 0.3125V, for a 1.25V ADC FSR and $K_{SF}=1/16$. In this implementation, to save memory space, the table entries may span a restricted $V_{in}$ operating supply range of 2.5 to 15V, corresponding to 41 individual FFG constants from 2.0000 to 0.3333. It is noted, however, that in other implementations these parameters corresponding to FFG correction unit 760 may varied as desired, e.g., the size of lookup table 1350 and the $V_{in}$ operating supply range.

Since the FFG lookup table 1350 includes an integer and fractional gain factor that is used to multiply the PID compensator output, once per PWM cycle, a dedicated hardware multiplier is typically needed in the design. In one embodiment, FFG correction unit 760 includes lookup table FFG constants encoded in CSD (Canonic Signed Digit) ternary form. This offers a more cost effective means of saving area and power. In this format, every FFG correction constant is expressed as a sum of descending powers of 2, with special sign bit manipulation. Ternary coding refers to the manner in which the CSD digits in each of the lookup table entries are represented. With this type of coding, each CSD digit can assume values of −1, 0, or +1 (as opposed to binary coding, which uses simply 0 and 1). In one specific implementation, word lengths for the FFG correction constants in the lookup table 1350 are about 10 CSD digits (i.e., 2 integer and 8 fractional digits), which may allow for reasonably good correction coefficient round-off accuracy. It is noted, however, that in other implementations the word lengths may be varied as desired.

One advantage of using CSD coding for the FFG correction constants is that, on average, it may require fewer non-zero digits than a straight binary representation. Therefore, this may reduce the number of individual arithmetic operations that may need to be performed on the PID data (or scaled version thereof) to obtain the final corrected duty cycle command.

In the depicted embodiment of FIG. 13, a multiplication operation of the PID output word by a CSD encoded constant is performed using a bank of shifters 1320A–I and add/subtract engines 1330A–J. In this embodiment, each of the non-zero digits (i.e. the +1's or −1's) in the FFG correction constant that was selected and stored in CSD data register 1340 generates a control input to each of the add/subtract engines 1330. The outputs of all the engines 1330 are summed in an accumulator 1370 to produce the final product of the PID data and the selected lookup table FFG correction constant. In some embodiments, the number of shifters 1320 and add/subtract engines 1330 may be restricted by limiting the number of non-zero CSD digits in each table entry. This may be done via a software routine when the FFG table constants are computed. In an alternative embodiment, a single shifter 1320 and add/subtract engine 1330 may be multiplexed between all the non-zero CSD digits for each table entry by using a higher frequency master clock.

Noise-Shaped Truncation Unit

In some embodiments, the high-resolution duty cycle output from PID compensator 750 following FFG correction may not be used directly in a typical digital PWM loop because of restrictions on the bit width of digital PWM (e.g., D-PWM 780 of FIG. 7). Hardware implementations of a digital PWM with more than 10 bits of resolution usually involve very high clock rates and difficult timing trade-offs. As such, it is advantageous to reduce the resolution of the PID duty cycle command to 10 bits, or less. This may need to be accomplished in a manner, however, which does not result in limit cycle oscillations in the digital control loop.

Limit cycle oscillations may occur when the effective output change due to D-PWM time increment quantization (i.e. the time value of its LSB) results in a larger voltage step size than the available input error ADC step size. When this occurs, the digital control loop tries to find an optimal DC operating point, which typically does not exist. Instead, it will usually oscillate between the two closest values that straddle the optimal DC solution, at some sub-multiple of the switching rate ($F_{sw}$). This behavior is undesirable since it may result in low-frequency tones and audible noise in the power converter (e.g., power converter 700), which may cause equipment interference problems.

Figure 14:
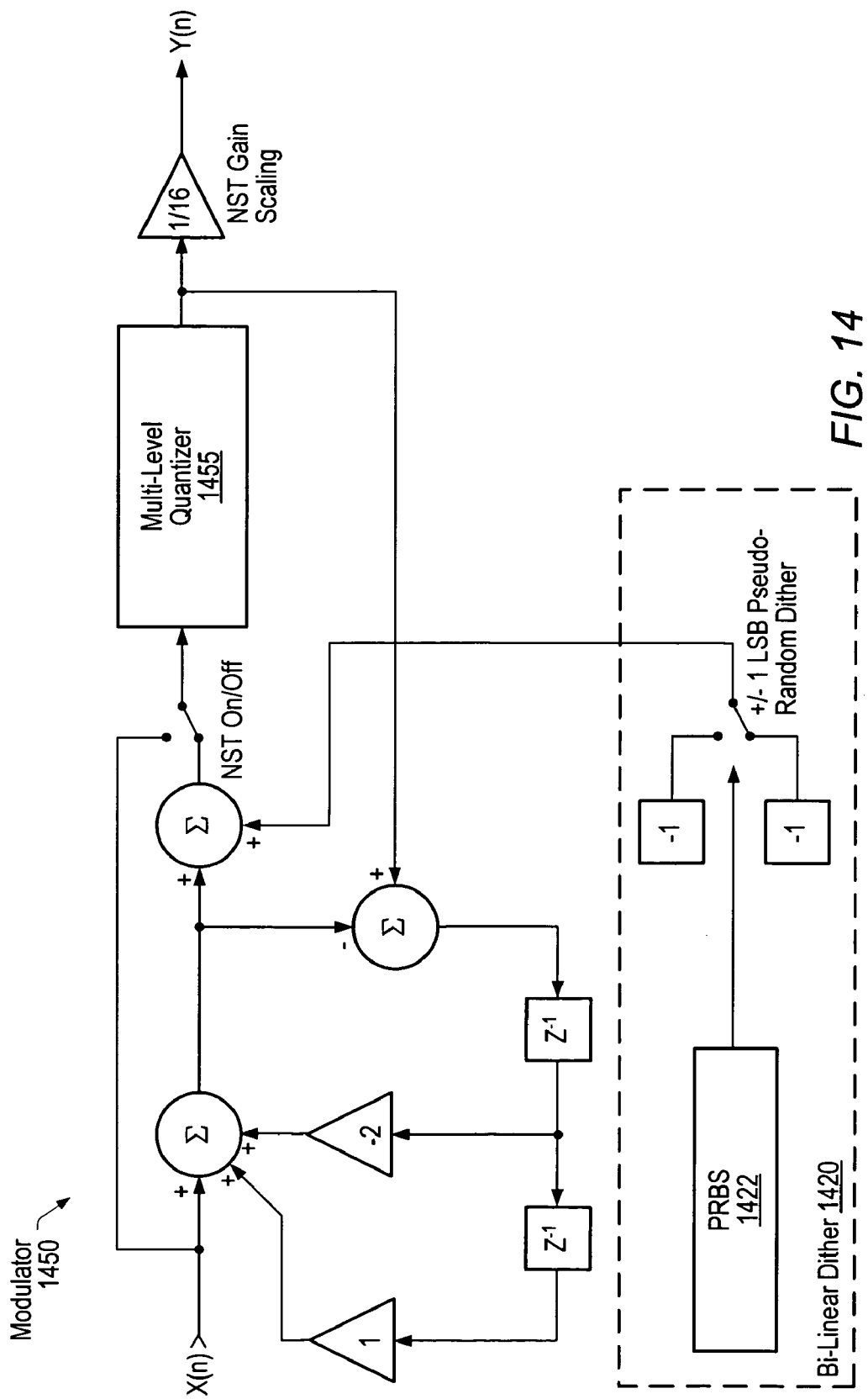
FIG. 14 is a block diagram of one embodiment of noise-shaped truncation (NST) unit.

FIG. 14 is a block diagram of one embodiment of noise-shaped truncation (NST) unit 770. NST unit 770 uses the principle of noise-shaped word length truncation to reduce the resolution of the PID duty cycle command, while mitigating the propensity towards limit cycle behavior. In one embodiment, NST unit 770 includes a multi-bit error-feedback $2^{nd}$ order delta-sigma modulator 1450, operating on the high-resolution duty cycle data. Modulator 1450 reduces the world length of the duty cycle command (e.g., typically 12–16 bits) to 10 bits or less. It is noted, however, that in other embodiments modulator 1450 of NST unit 770 may be designed to reduce the resolution to other values as desired. Modulator 1450 operates on the principle of noise shaping, and pushes the requantization error of the lower resolution output up to much higher frequencies where it will be filtered out, e.g., by the low-pass action of the LC/power stage 790 of FIG. 7. In various implementations, it is advantageous to use an order of 2 or higher in the error-feedback modulator 1450 to attenuate the effects of word length truncation noise at low frequencies. This action may push most of the requantization error up into the region of $F_{sw}/2$, for example.

In some embodiments, NST unit 770 may include a bi-linear dither generator 1420, which adds a random +/−1 LSB input code (with respect to the high-resolution duty cycle command) to the input of the multi-bit requantizer 1455 in the error-feedback delta-sigma modulator 1450. Bi-linear dither generator 1420 breaks up the repetitive tones that usually appear in the noise-shaped output due to local, internal, limit cycle behavior with a $2^{nd}$-order delta-sigma modulator. The Pseudo Random Binary Source (PRBS) 1422, e.g., a 10-stage PRBS, produces a random pattern of 1's and 0's, which are used to select whether a dither value of +1 or −1 LSB, respectively, is used. In one embodiment, PRBS 1422 may have an output pattern repetition rate of approximately $F_{sw}/1024$, which may be low enough not to cause any specific problems with loop regulation or settling behavior following a load transient.

The output of NST unit 770 may be provided to D-PWM 780, which may convert the error-truncated duty cycle command into a time based waveform whose pulse width is proportional to the applied digital input code. It should be noted that the components described with reference to FIGS. 8–14 are meant to be exemplary only, and are not intended to limit the invention to any specific set of components or configurations. For example, in various embodiments, one or more of the components described may be omitted, combined, modified, or additional components included, as desired. For instance, as described above, FFG correction may be implemented entirely in software, or in hardware and software.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A power converter comprising:
 error detection circuitry configured to generate an error signal based on the difference between a power converter output voltage and a reference voltage;
 an oversampling analog-to-digital converter (ADC) configured to digitize the error signal;
 wherein a transfer function associated with the ADC includes quantization levels spaced at non-uniform intervals away from a center code.

2. The power converter of claim 1, wherein the quantization levels are spaced at increasing powers of 2 away from the center code.

3. The power converter of claim 1, wherein the quantization levels are spaced at increasing powers of 2 away from the center code, with the exception that at least one of the quantization levels spaced at increasing powers of 2 away from the center code is removed.

4. The power converter of claim 1, further comprising a digital filter configured to calculate the average of the digitized error signal.

5. The power converter of claim 1, further comprising:
 a digital filter configured to calculate the average of the digitized error signal; and
 a nonlinear requantizer configured to reduce the number of codes corresponding to the output of the digital filter to values that are spaced at non-uniform intervals away from the center code.

6. The power converter of claim 5, wherein the nonlinear requantizer is configured to reduce the number of codes corresponding to the output of the digital filter to values that are represented as a sum of a reduced number of powers of 2.

7. The power converter of claim 5, wherein the nonlinear requantizer is configured to reduce the number of codes corresponding to the output of the digital filter to values that are spaced at increasing powers of 2 away from the center code.

8. The power converter of claim 1, further comprising:
a digital filter configured to calculate the average of the digitized error signal;
a nonlinear requantizer configured to reduce the number of codes corresponding to the output of the digital filter to values that are spaced at non-uniform intervals away from the center code;
a proportional integral derivative (PID) unit configured to multiply the output of the nonlinear requantizer by PID coefficients to generate a PID duty cycle command; and
a gain compensation unit configured to dynamically adjust the PID coefficients to maintain a constant control loop gain.

9. The power converter of claim 8, wherein, in response to gain changes in an analog front-end of the power converter, the gain compensation unit is configured to dynamically adjust the PID coefficients to maintain a constant control loop gain.

10. The power converter of claim 8, wherein, in response to gain changes in a power stage of the power converter, the gain compensation unit is configured to dynamically adjust the PID coefficients to maintain a constant control loop gain.

11. The power converter of claim 8, wherein the gain compensation unit includes a feed-forward gain (FFG) correction unit configured to measure an input voltage to a power stage of the power converter to detect gain changes in the power stage, wherein, in response to detecting gain changes in the power stage, the FFG correction unit is further configured to process the PID duty cycle command using a lookup table to maintain a constant control loop gain.

12. The power converter of claim 11, wherein the PID duty cycle command is processed using lookup table FFG correction constants that are encoded in Canonic Signed Digit (CSD) ternary form.

13. The power converter of claim 1, further comprising:
a digital filter configured to calculate the average of the digitized error signal;
a nonlinear requantizer configured to reduce the number of codes corresponding to the output of the digital filter to values that are spaced at non-uniform intervals away from the center code;
a proportional integral derivative (PID) unit configured to multiply the output of the nonlinear requantizer by PID coefficients to generate a PID duty cycle command;
a gain compensation unit configured to dynamically adjust the PID coefficients to maintain a constant control loop gain; and
a noise-shaped truncation unit including a multi-level error-feedback delta sigma modulator configured to reduce the resolution of the PID duty cycle command.

14. The power converter of claim 1, further comprising an analog front-end including at least a programmable gain amplifier (PGA) and a reference voltage generator, wherein the PGA is operable to maximize the applied dynamic range of the reference voltage generator, the error detection circuitry, and the oversampling ADC.

15. The power converter of claim 1, further comprising an attenuator circuit coupled to the output of the power converter and configured to attenuate the power converter output voltage, wherein the error detection circuitry is configured to generate an error signal based on the difference between the attenuated power converter output voltage and a reference voltage.

16. A method for operating a power converter, the method comprising:
generating an error signal based on the difference between a power converter output voltage and a reference voltage;
digitizing the error signal using an oversampling analog-to-digital converter (ADC);
wherein, in said digitizing the error signal, implementing a transfer function associated with the ADC that includes quantization levels spaced at non-uniform intervals away from a center code.

17. The method of claim 16, wherein, in said digitizing the error signal, implementing a transfer function associated with the ADC that includes quantization levels spaced at increasing powers of 2 away from the center code.

18. The method of claim 16, further comprising:
calculating the average of the digitized error signal and generating a modified error signal; and
requantizing the modified error signal to reduce the number of codes to values that are spaced at non-uniform intervals away from the center code.

19. The method of claim 18, further comprising requantizing the modified error signal to reduce the number of codes to values that are spaced at increasing powers of 2 away from the center code.

20. The method of claim 16, further comprising:
calculating the average of the digitized error signal and generating a modified error signal;
requantizing the modified error signal to reduce the number of codes to values that are spaced at non-uniform intervals away from the center code;
multiplying the requantized error signal by PID coefficients to generate a PID duty cycle command; and
dynamically adjusting the PID coefficients to maintain a constant control loop gain.

21. The method of claim 16, further comprising:
calculating the average of the digitized error signal and generating a modified error signal;
requantizing the modified error signal to reduce the number of codes to values that are spaced at non-uniform intervals away from the center code;
multiplying the requantized error signal by PID coefficients to generate a PID duty cycle command;
dynamically adjusting the PID coefficients to maintain a constant control loop gain; and
performing noise-shaped word length truncation to reduce the resolution of the PID duty cycle command.

22. A power distribution system including a plurality of power converters, wherein each power converter comprises:
error detection circuitry configured to generate an error signal based on the difference between a power converter output voltage and a reference voltage;
an oversampling analog-to-digital converter (ADC) configured to digitize the error signal, wherein a transfer function associated with the ADC includes quantization levels spaced at non-uniform intervals away from a center code;
a digital filter configured to calculate the average of the digitized error signal;

a nonlinear requantizer configured to reduce the number of codes corresponding to the output of the digital filter to values that are spaced at non-uniform intervals away from the center code;

a proportional integral derivative (PID) unit configured to multiply the output of the nonlinear requantizer by PID coefficients to generate a PID duty cycle command;

a gain compensation unit configured to dynamically adjust the PID coefficients to maintain a constant control loop gain; and a noise-shaped truncation unit configured to reduce the resolution of the PID duty cycle command.

* * * * *